United States Patent
Kim et al.

(10) Patent No.: US 8,243,420 B2
(45) Date of Patent: Aug. 14, 2012

(54) CONDUCTIVE ELECTRODE USING CONDUCTING METAL OXIDE FILM WITH NETWORK STRUCTURE OF NANOGRAINS AND NANOPARTICLES, PREPARATION METHOD THEREOF AND SUPERCAPACITOR USING THE SAME

(75) Inventors: Il Doo Kim, Seoul (KR); Jae-Min Hong, Seoul (KR); Seong Mu Jo, Seoul (KR); Dong Young Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 777 days.

(21) Appl. No.: 12/189,612

(22) Filed: Aug. 11, 2008

(65) Prior Publication Data
US 2010/0002357 A1   Jan. 7, 2010

(30) Foreign Application Priority Data
Mar. 20, 2008   (KR) .................... 10-2008-0025996

(51) Int. Cl.
*H01G 9/00* (2006.01)

(52) U.S. Cl. .................... 361/502; 361/503; 29/25.03

(58) Field of Classification Search .................. 361/502, 361/503
See application file for complete search history.

(56) References Cited

U.S. PATENT DOCUMENTS

| 6,205,016 | B1 | 3/2001 | Niu |
| 7,122,106 | B2 | 10/2006 | Lin et al. |
| 2007/0095657 | A1* | 5/2007 | Kim et al. ............... 204/290.12 |

FOREIGN PATENT DOCUMENTS

| JP | 2002324545 A | * | 11/2002 |
| KR | 1020070066859 A | | 6/2007 |

* cited by examiner

*Primary Examiner* — Eric Thomas
(74) *Attorney, Agent, or Firm* — William E. Beaumont

(57) ABSTRACT

A porous conducting metal oxide electrode prepared by depositing a porous conducting metal oxide film containing a conducting metal oxide film layer having a network structure of nanofibers, containing nanograins or nanoparticles, on at least one surface of a current collector, and a conducting metal oxide coating layer on the network layer of the porous conducting metal oxide through a constant current method or a cyclic voltammetric method; and a high-speed charge/discharge and ultrahigh-capacity supercapacitor using the porous conducting metal oxide electrode are provided.

22 Claims, 15 Drawing Sheets

(a)

(b)

(a)

(b)

(a)

(b)

(a)

(b)

(a)

(b)

(a)

(b)

(a)

(b)

(a)

(b)

(a)

(b)

(c)

(a)

(b)

US 8,243,420 B2

CONDUCTIVE ELECTRODE USING CONDUCTING METAL OXIDE FILM WITH NETWORK STRUCTURE OF NANOGRAINS AND NANOPARTICLES, PREPARATION METHOD THEREOF AND SUPERCAPACITOR USING THE SAME

CROSS-REFERENCE TO RELATED APPLICATION

This application claims under 35 U.S.C. §119(a) the benefit of Korean Patent Application No. 10-2008-0025996 filed Mar. 20, 2008, the entire contents of which are incorporated herein by reference.

BACKGROUND OF THE INVENTION

1. Field of the Invention

The present invention relates to a porous conducting metal oxide electrode prepared by depositing a porous conducting metal oxide film comprising a conducting metal oxide film layer having a network structure of nanofibers, comprising nanograins or nanoparticles, on at least one surface of a current collector, and a conducting metal oxide coating layer on the network layer of the porous conducting metal oxide through the constant current method or the cyclic voltammetric method, and a high-speed charge/discharge and ultrahigh-capacity supercapacitor using the porous conducting metal oxide electrode. The capacitor electrode, with a metal oxide film layer deposited on a porous conducting metal oxide film through an electrochemical method such as the constant current method or the cyclic voltammetric method, on a substrate in which a fine conducting metal oxide network layer is formed on a current collector, has ultrahigh-capacity and high-speed charge/discharge characteristics.

2. Description of the Background

Ruthenium oxide ($RuO_2$), a conducting metal oxide, is a transition metal oxide having a tetragonal rutile structure. Especially, with good thermal and chemical resistance and superior electrical conductivity in spite of being an oxide, it has been widely used as an alternative for a metal electrode, a sensor, a catalyst, and the like.

Recently, researches have been actively carried out on the electrochemical wastewater treatment utilizing electrolytic oxidation of insoluble oxide catalyst electrodes as DSA (dimensionally stable anode). In particular, to improve the efficiency of pollutant oxidation, researches have been focused on the use of an anode prepared by forming a ruthenium-tin or iridium-tin oxide layer on titanium [Korean Patent Registration No. 10-0310272]. Further, researches on the application of electrochemical capacitors have been also carried out actively with the increased concerns on high-density, high-output energy storage systems.

A typical example is an electrochemical capacitor which stores charge through pseudocapacitance utilizing the reversible faradic surface redox reaction at the electrode/electrolyte interface.

Supercapacitors can be classified into active carbon-based, metal oxide-based pseudocapacitor based on reversible faradic surface redox reaction at the electrode/electrolyte interface, electrically conducting polymer-based capacitor enabling oxidation and reduction, and the like, depending on the electrode material.

Such an electrochemical capacitor may be used, alone or in combination with a secondary battery cell, as power source of compact medical appliances or mobile communication devices. It may also be utilized as power source of electric vehicles and hybrid cars. Examples of materials that exhibit pseudocapacitance include transition metal oxides such as $IrO_2$ and $RuO_2$. Until now, $RuO_2$ has been known to provide the best characteristics for use as electrode for a supercapacitor.

To attain superior supercapacitor characteristics, the electrode material should have a large specific surface area and a low internal resistance. Also, the redox reaction at the surface in the available potential range should be continuous. In addition, researches on the utilization of the Pt—$RuO_2$ electrode catalyst in direct-methanol fuel cells (DMFCs) are carried out actively. As such, transition metal oxides, particularly ruthenium oxide having superior electrical conductivity, can be utilized in various applications.

In this regard, it is important to prepare a ruthenium oxide having large specific surface area and porosity while maintaining superior electrical conductivity. For example, some researches on preparing ruthenium oxide having a nanowire structure using anodized aluminum oxide (AAO) as template in order to improve chemical reactivity by increasing surface area have been reported.

To be specific, Korean Patent Registration No. 10-1534845 discloses a preparation method of metal oxide electrode having a diameter in the range of from dozens to several hundreds of nanometers using AAO as a template. However when a template such as AAO is used, a good productivity cannot be attained. Further, since the size of the ruthenium oxide nanowire is restricted by the size of the template, this method is not suitable for large-scale production in view of cost competitiveness and reproducibility.

Accordingly, a process enabling a simple large-scale production of ruthenium oxide with a network structure of ultrafine nanograins and/or nanoparticles having a size of 5 to 30 nm is becoming more and more important. If it is possible to increase specific surface area of ruthenium oxide ($RuO_2$) having superior electrical conductivity through such a simple process, superior characteristics can be attained in above-mentioned various applications, including electrode of supercapacitor, catalyst for DMFC, sensor, insoluble oxide catalyst electrode, conductive electrode, and the like. This can be attained with any conducting metal oxide having superior conductivity. That is, ruthenium oxide as well as conductive electrode materials having a conductivity of >0.1 S/cm. ($IrO_x$, $NiO_x$) may be utilized as electrode material for conductive electrodes and supercapacitors.

To this end, it is important to attain a nanofiber network structure of a metal oxide, including ruthenium oxide, $IrO_x$ and $NiO_x$, to significantly increase specific surface area and realize a porous structure.

The inventors of the present invention have filed a patent application related to an ultra-sensitive metal oxide gas sensor and a preparation method thereof (Korean Patent Laid-open No. 2007-66859). In this invention, a metal oxide having a semiconductor characteristic is used to sense the change of resistance depending on gas adsorption. In the sensor, an oxide semiconductor having a band gap of approximately 3.2 to 4.5 eV, such as $TiO_2$, $SnO_2$, $ZnO$, etc., is used. The metal oxide semiconductor used in this invention is restricted in application as an electrode or electrode catalyst for replacing metal electrode or for ultrahigh-capacity, high-speed supercapacitors.

SUMMARY OF THE INVENTION

There has been an increasing demand toward the development of a process enabling a simple large-scale production of ruthenium oxide with a network structure of ultrafine nanograins and/or nanoparticles generally having a size of 5 to 50 nm, preferably 5 to 30 nm. Therefore, an object of the present invention is to provide a conductive electrode using new improved porous conducting metal oxide and a high-speed, high-capacity supercapacitor using the electrode.

In an aspect, the present invention provides a porous conducting metal oxide electrode comprising: a current collector; a conducting metal oxide film layer having a nanofiber network structure of nanograins or nanoparticles formed on at least one surface of the current collector; and a conducting metal oxide coating layer formed on the conducting metal oxide film layer.

In another aspect, the present invention provides a preparation method of a porous conducting metal oxide electrode comprising: a first step of spinning a mixture solution of a conducting metal precursor and a polymer on a current collector to prepare a conducting metal precursor-polymer composite fiber; a second step of heat compressing or hot pressing the conducting metal precursor-polymer composite fiber; a third step of heat treating the heat compressed or hot pressed composite fiber to prepare a porous conducting metal oxide film having a network structure with the polymer removed from the composite fiber; and a fourth step of coating a conducting metal oxide on the porous conducting metal oxide film.

In another aspect, the present invention provides a supercapacitor device using the porous conducting metal oxide electrode.

The porous conducting metal oxide film of the present invention, which has a network structure of ultrafine nanograins and/or nanoparticles with a size of 5 to 30 nm, has significantly improved specific surface area and superior electrical conductivity. An electrode prepared by forming a conducting metal oxide coating layer on the porous conducting metal oxide film is applicable particularly for electrode of supercapacitors, catalyst for DMFCs, sensor, insoluble oxide catalyst electrode, and the like. Further, adhesion between a current collector and the conducting metal oxide film layer is significantly improved through a heat compressing or hot pressing process, and it is possible to easily form a thick conducting metal oxide film layer by adjusting the spinning time.

BRIEF DESCRIPTION OF THE DRAWINGS

The above and other objects, features and other advantages of the present invention will be more clearly understood from the following detailed description taken in conjunction with the accompanying drawings, in which:

FIG. 6a shows a transmission electron microscopic (TEM) image of a RuO$_2$ nanofiber prepared by heat treating the RuO$_2$/PVAc composite fiber at 450° C. without heat compressing, in accordance with the present invention, and FIG. 6b shows a high resolution TEM image of FIG. 6a;

DETAILED DESCRIPTION OF THE PREFERRED EMBODIMENT

The inventors of the present invention have filed a patent application related to an ultra-sensitive metal oxide gas sensor and a preparation method thereof (Korean Patent Laid-open No. 2007-66859). Although this invention discloses a sensor equipped with a metal oxide film layer having a structure similar to that of the present invention, the metals used in the metal oxide films are entirely different in the two inventions. Specifically, the metal oxide used in Korean Patent Laid-open No. 2007-66859 has a semiconductor property, whereas the metal oxide used in the present invention has a conductor property. Thus, the metals of the two inventions are quite different in electrical and physical properties. As well known to those skilled in the art, a conductor transmits heat and/or electricity well, whereas a semiconductor has conductivity in between that of a conductor and that of an insulator. Such difference in physical and electrical properties results in different applications of the metal oxide films.

To describe the difference of the two inventions in more detail, the conducting metal oxide film in the present invention plays the role of a metal electrode with superior electrical conductivity. In particular, the specific conducting metal oxides presented by the present invention such as $RuO_2$, $NiO_x$ and $IrO_2$ can be used as electrode material for supercapacitors, catalyst for DMFCs, sensor, insoluble oxide catalyst electrode, and the like because of irreversible reduction characteristics. In contrast, semiconducting metal oxides are used in sensors in order to detect the change of electrical resistance depending on the kind of gas adsorbed on the surface.

In such metal oxides, the difference of conductors and semiconductors results not just from simple substitution of the element but from difference of band structure. Hence, the two are considered as belonging to entirely different categories. Certain elements (Ru, Ir, Ni, etc.) that have high electrical conductivity in metal phase also have high electrical conductivity as oxides ($RuO_2$, $IrO_2$, $NiO_x$). On the contrary, typical oxide semiconductors ($TiO_2$, $SnO_2$, ZnO, etc.) have a band gap of 3.0 to 4.5 eV, and thus, have electrical conductivity in the range of from $3\times10^{-5}$ S/cm to 0.1 S/cm at room temperature. Similarly as described earlier, the difference of conducting metal oxides and semiconducting metal oxides results not just from simple substitution of the element. Further, in nanograins and nanoparticles phases, the conducting and semiconducting properties should be considered as belonging to entirely different categories, and applications thereof are also different.

A preparation process of a porous conducting metal oxide film having a network structure of nanograins and nanoparticles in accordance with the present invention will be described in detail.

Figure 1:
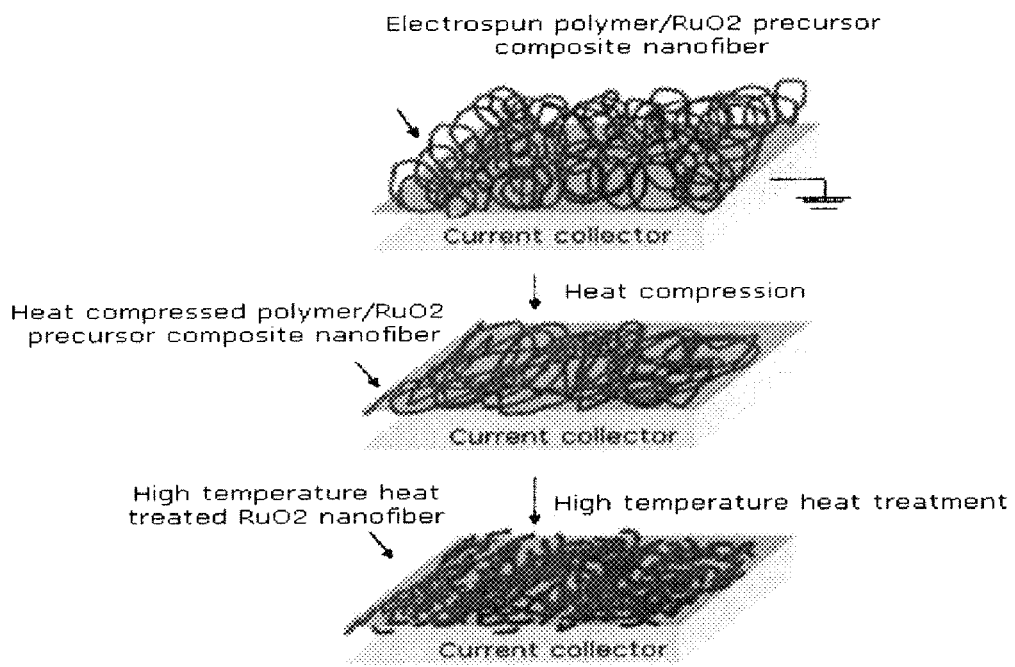
FIG. 1 schematically shows a process of preparing ruthenium oxide having a network structure of nanograins and nanoparticles according to the present invention.
Figure 2:
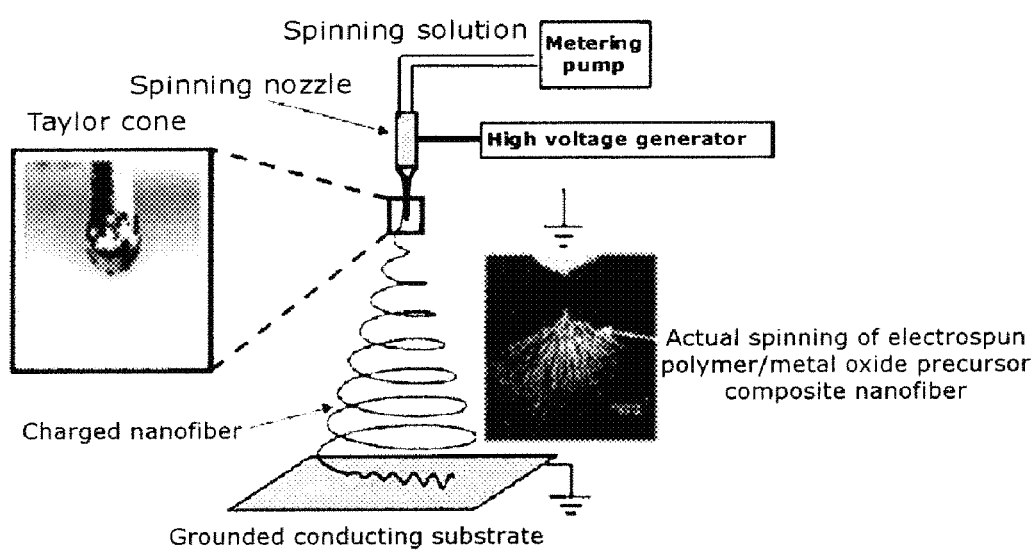
FIG. 2 schematically shows an electrospinning apparatus used in the present invention.

FIG. 1 schematically shows a process of preparing conducting metal oxide film according to the present invention. A process of preparing $RuO_2$ film is described. And, FIG. 2 schematically shows an electrospinning apparatus used in the present invention. Specifically, the conducting metal oxide film according to the present invention is prepared by: (1) spinning a mixture solution of a conducting metal precursor and a polymer on a current collector to prepare a conducting metal precursor-polymer composite fiber; (2) heat compressing or hot pressing the conducting metal precursor-polymer composite fiber; and (3) heat treating of the heat compressed or hot pressed composite fiber to prepare a porous conducting metal oxide film having a network structure with the polymer removed from the composite fiber.

In more detail, referring to FIG. 1, a mixture solution of a conducting metal precursor, which can form a conducting metal oxide through spinning followed by heat treatment, and a polymer is prepared. Then, the mixture solution is spun on a current collector to from an ultrafine conducting metal oxide precursor/polymer composite fiber through phase separation or mutual mixing of the conducting metal precursor and the polymer.

Then, the composite fiber is heat compressed or hot pressed in order to melt the polymer wholly or in part while increasing the contact area of the fiber, thereby increasing adhesion force to the current collector. Instead of thermal compression step, heating slightly above the glass transition temperature may be sufficient if the partial or whole melting of the polymer can be induced. Also, it is possible to melt the conducting metal precursor/polymer composite fiber by evaporating ethanol or DMF in a sealed container. In this case, in order to prevent abrupt volatilization of the polymer, heat treating may be carried out sequentially from low (100° C., 200° C.) to high temperature.

Subsequently, the polymer substance is removed from the composite fiber via heat treatment, in order to obtain a thin film having a ruthenium oxide nanofiber network. The resultant ruthenium oxide film is a porous metal oxide film formed on at least one surface of the current collector. The nanofiber network structure of nanograins and/or nanoparticles maximizes surface area and reaction area and significantly improves adhesivity of the conducting metal oxide film to the current collector.

The current collector may be made of platinum (Pt), gold (Au), palladium (Pd), iridium (Ir), silver (Ag), rhodium (Rh), ruthenium (Ru), nickel (Ni), stainless steel, aluminum (Al), titanium (Ti), molybdenum (Mo), chromium (Cr), copper (Cu), tungsten (W), ITO (In doped $SnO_2$), FTO (F doped $SnO_2$) or a metal formed on Si wafer. Alternatively, such metal may be patterned on an oxide substrate such as $Al_2O_3$, MgO, $ZrO_2$, etc, the substrate not being specially restricted.

In accordance with the present invention, a nanofiber network of conducting metal oxide film may be prepared by spinning method. Specific examples of the spinning method include electrospinning, melt-blown spinning, flash spinning, electrostatic melt-blown spinning, and the like. In an embodiment of the present invention, an electrospinning method is used, but the present invention is not limited thereto.

First, a spinning solution is prepared. To this end, a sol-gel precursor of conducting metal oxide and an adequate polymer are mixed. Here, the polymer serves to increase the viscosity of the solution thereby forming a fiber phase during spinning, and provide compatibility with the conducting metal oxide precursor thereby controlling the structure of the spun fiber.

The precursor capable of forming a network of conducting metal oxide used in the present invention is a precursor including conducting metal ions. Any one that can form a conducting metal oxide as mixed with a polymer via heat treatment at 200° C. or above after spinning can be used, without particular limitation. Specifically, the conducting metal oxide may be ruthenium oxide ($RuO_x$), nickel oxide ($NiO_x$), iridium oxide ($IrO_x$), and the like. The precursor material used to prepare the conducting metal oxide may be any one that can be dissolved in the solvent used along with a polymer. Sulfide, chloride, acetate, halide, etc., may be used, without particular limitation.

Especially, for the preparation of electrode for supercapacitors, ruthenium(III) chloride hydrate ($RuCl_3$ hydrate), ruthenium(III) chloride ($RuCl_3$), ruthenium(IV) sulfide ($RuS_2$), and the like may be used as a precursor of ruthenium oxide nanofiber network. And, iridium(III) chloride hydrate may be used as a precursor of iridium oxide nanofiber network, and nickel chloride may be used as a precursor of nickel oxide nanofiber network. The conducting metal oxide may be prepared by dissolving a material including each precursor and a polymer with high viscosity, followed by spinning and heat treating. Accordingly, any precursor material can be used without limitation in preparing conducting metal oxide.

The polymer used in the present invention may be at least one selected from polyurethane copolymers including polyurethane and polyether urethane; cellulose derivatives such as cellulose acetate, cellulose acetate butylate and cellulose acetate propionate; polymethyl methacrylate (PMMA), polymethylacrylate (PMA), polyacryl copolymer, polyvinyl acetate (PVAc), polyvinyl acetate copolymer, polyvinyl alcohol (PVA), polyfurfuryl alcohol (PPFA), polystyrene (PS), polystyrene copolymer, polyethylene oxide (PEO), polypropylene oxide (PPO), polyethylene oxide copolymer, polypropylene oxide copolymer, polycarbonate (PC), polyvinyl chloride (PVC), polycaprolactone, polyvinylpyrrolidone (PVP), polyvinyl fluoride, polyvinylidene fluoride copolymer and polyamide.

However, the present invention is not limited thereto, but any polymer that has a viscosity sufficient to form ultrafine fiber through electrospinning, etc. can be used without particular limitation.

The polymer that can be used in the present invention can be grouped into one having a superior compatibility with the metal oxide precursor and one having a poor compatibility. The former includes polyvinyl acetate, polyvinylpyrrolidone, polyvinyl alcohol, polyethyleneoxide, and the like. When electrospinning is carried out using these polymers used, phase separation proceeds slowly and a sol-gel reaction occurs, as will be described later. The latter includes polystyrene, etc. When electrospinning is carried out using these polymers used, phase equilibrium is not maintained well and solidification occurs rapidly because of poor compatibility with the metal oxide precursor. However, even with a polymer with poor compatibility, it is possible to attain a conducting metal oxide nanofiber with a network structure through heat compressing in which the polymer is heat treated after being melt wholly or in part.

In an embodiment of the present invention, an electrospinning solution is prepared from a ruthenium precursor as follows. First, a ruthenium oxide precursor and polyvinyl acetate having superior compatibility thereto are dissolved in dimethylformamide (DMF), acetone, tetrahydrofuran, toluene or a mixture solvent thereof. Then, a 5 to 20 weight % of polymer solution is prepared which provides a viscosity adequate to form a fiber through electrospinning. When the concentration of the polymer solution is lower than 5 weight %, the viscosity is too low. And, when it exceeds 20 weight %, stable electrospinning does not occur because the viscosity is too high. Hence, it is preferred that the aforesaid range be maintained. Here, for the polyvinyl acetate one having a weight-average molecular weight in the range of from 100,000 to 1,500,000 g/mol is used.

Next, ruthenium(III) chloride hydrate is added to the polyvinyl acetate polymer solution in an amount of 1 to 60 weight %, based on the weight of the polymer. After adding 0.01 to 60 weight % of acetic acid as catalyst based on the weight of the ruthenium(III) chloride hydrate, reaction is carried out at room temperature for 1 to 10 hours. The resultant solution is used as electrospinning solution.

The above method can be adopted similarly when a conducting metal precursor other than ruthenium is used.

Next, conducting metal oxide and polymer composite fiber are prepared, and electrospinning is carried out using an electrospinning apparatus to prepare a network of ultrafine composite fiber.

Referring to FIG. 2, the electrospinning apparatus comprises a spinning nozzle connected to a metering Pump that quantitatively supplies the spinning solution, a high voltage generator, an electrode on which a spun fiber layer is formed, and the like. Depending on applications, a grounded metal substrate, such as platinum (Pt), gold (Au), palladium (Pd), iridium (Ir), silver (Ag), rhodium (Rh), ruthenium (Ru), nickel (Ni), titanium (Ti), chromium (Cr), molybdenum (Mo), stainless steel (SUS), aluminum (Al), copper (Cu) and tungsten (W), or a transparent conducting oxide electrode, such as ITO or FTO, is used as cathode, and the spinning nozzle to which the pump is attached is used as anode. By applying a voltage of 10 to 30 kV and controlling the ejection rate of the solution at 10 to 50 µL/min, an ultrafine fiber having a thickness of 50 nm to 1000 nm can be prepared. Spinning is performed until a film of an ultrafine conducting metal oxide fiber is formed on a current collector with a thickness of 0.1 to 20 µm. The thickness of the conducting metal oxide film formed on the current collector can be easily controlled by adjusting the spinning time.

The conducting metal precursor/polymer composite fiber resulting from the spinning is involved in a complicated forming process. As illustrated in FIG. 2, the spinning solution is ejected from spinning nozzle charged by the high voltage generator, and a fiber is extended to the grounded conducting substrate by an electric field. From the spinning nozzle toward the grounded substrate, a jet flow of the spinning solution is formed in the shape of a cone. This is called the Taylor cone. When spinning begins from the Taylor cone positively-charged by the spinning nozzle of the electrospinning apparatus, phase transition of the inorganic oxide precursor occurs from sol to gel states by the reaction with water included in the air.

With the fast spinning accompanied by the sol-gel transition, the fiber becomes thinner in diameter and surface area increases as the solvent evaporates. In this process, chemical reaction occurs and the concentration of the solution changes abruptly. Further, surface temperature of the fiber decreases as the solvent evaporates, which results in condensation of water contained in the air and affects the sol-gel transition. In particular, since the electrospinning of the conducting metal oxide-polymer mixture solution occurs with the aid of water, temperature and humidity around the spinning apparatus are important process variables.

Next, a conducting metal oxide nanofiber network is prepared. The current collector on which the electrospun ultrafine composite fiber is formed is heat compressed and hot pressed above the glass transition temperature of the used polymer. Temperature, pressure and time of the heat compressing and hot pressing may be determined adequately considering the kind of the substrate, kind of the polymer, glass transition temperature of the polymer, and so forth. In general, heat compressing may be performed at 80 to 200° C., with a pressure of 0.01 to 50 psi, for 10 seconds to 10 minutes. For instance, when polyvinyl acetate is used as the polymer, heat compressing may be performed under the condition of 120° C. and 1.5 kgf/cm$^2$ (based on 1.5 ton, 10 cm×10 cm current collector, 21.34 psi). Because the kind and glass transition temperature of the polymer are various, the heat compressing condition is not particularly limited, but, preferably, the compressing is performed at a pressure of at least 0.1 MPa, specifically at 0.1 to 10 MPa.

Further, heating without compression or pressing using hot compressed air may be employed, provided that the polymer can be melt at or above the glass transition temperature. Alternatively, the polymer may be dissolved while evaporating ethanol and methanol in an airtight container in order to improve adhesion property. Through the control of compressing pressure and temperature, it is possible to attain the wanted surface structure control. During the heat compressing process, the flow between the metal oxide precursor and the polymer, which have been phase-separated during the electrospinning, is reduced, and through the following heat treating process, a network structure of nanofibers comprising nanograins and/or nanoparticles is formed.

Through the heat compressing or hot pressing process, all or part of the polymer included in the composite fiber is melt, resulting in improvement of adhesion to the current collector, and significantly improving specific surface area and density per unit volume after the heat treatment. As a result, conducting metal oxide comprising ultrafine nanograins or nanoparticles with greatly enlarged specific surface area can be formed. Without the heat compressing process, the conducting metal oxide nanofiber is easily detached from the substrate after heat treatment.

After heat compressing followed by decomposition and removal of the polymer via heat treatment in the air at 350 to 800° C. for 10 to 120 minutes, a conducting metal oxide network of nanograins or nanoparticles is attained. Temperature and time of the heat treating following the heat compressing are determined considering crystallization and sintering temperature, depending on purposes and applications. Based on the temperature and time of the heat treating, the degree of crystallization of the nanograins, size thereof, etc. can be easily expected. When the temperature is below 350° C., decomposition and removal of the polymer may not be complete. And, when it exceeds 800° C., it may cause a reaction with the substrate. Hence, it is preferred that the aforesaid range be maintained.

Following the electrospinning and heat compressing, the nanograins and nanoparticles constituting the heat treated conducting metal oxide film have an average size of 2 to 50 nm and a fine porous structure. The specific surface area is in the range of from 15 to 150 $m^2/g$, and some network structure of nanofiber remains.

Such prepared porous conducting metal oxide film may be applied for conductive electrode and electrode for supercapacitors.

Specifically, when applied for a supercapacitor, heat treatment may be performed at low temperature in the range of 250 to 350° C. during the preparation of the conducting metal oxide film, in order to obtain an amorphous conducting metal oxide film. But, in this case, conductivity may decrease because the polymer is not removed completely. The supercapacitor comprises two electrodes, an electrolyte, a separator and a case. Among them, the electrode plays the most important role. In order to fabricate a supercapacitor maintaining high capacity even at high-speed charge/discharge, the electrode making up the supercapacitor needs to have high electrical conductivity along with large specific surface area and good electrochemical stability. In the present invention, in order to prepare such an electrode, a metal oxide layer of amorphous or ultrafine nanograins and/or nanoparticles is coated on a conducting metal oxide film having a network structure of nanograins and nanoparticles, for example on a conducting metal oxide film of ruthenium oxide ($RuO_x$), nickel oxide ($NiO_x$) or iridium oxide ($IrO_x$) that has been heat treated at 400° C. or above, by constant current or cyclic voltammetric method. To coat an amorphous metal oxide layer is more preferable.

The metal oxide used to form the coating layer may be one commonly used in the related art and is not particularly restricted. Specifically, ruthenium oxide, rubidium oxide, iridium oxide, nickel oxide, cobalt oxide, manganese oxide, vanadium oxide, and the like may be very thinly coated on a conducting metal oxide network layer with superior conductivity and formed by spinning. As such, high-capacity and high-speed characteristics may be ensured through enhanced specific surface area. In particular, the superior electrical conductivity of the conducting metal oxide inside the metal oxide film layer provides very superior high-speed (rate performance) characteristics.

For example, a ruthenium oxide film layer, which is one of conducting metal oxides having superior conductivity, is formed by immersing a substrate, on which a conducting metal oxide film with a network of nanograins and nanoparticles is coated, in a ruthenium oxide precursor solution prepared by dissolving ruthenium trichloride hydrate ($RuCl_3 \cdot nH_2O$) in deionized water to a concentration of 0.005 to 0.1 M, and carrying out coating in a temperature range from 30° C. to 70° C. As occasion demands, electrolyte such as gallium chloride, hydrogen chloride, etc. is added. The coated electrode is heat treated, preferably at 150 to 200° C., for 30 minutest to 2 hours.

In case of deposition by the constant current method, the substrate on which the deposition is to be carried out is used as cathode and platinum is used as anode. Then, deposition is carried out under a constant current, preferably with a current density in the range of from 0.5 to 10 $mA/cm^2$. The larger the current density, the faster the ruthenium oxide is coated. Hence, a low current density is preferred to attain a dense ruthenium oxide coating.

In case of deposition by the cyclic voltammetry, a three electrode system is used. The substrate on which the deposition is to be carried out is used as working electrode, platinum is used as counter electrode, and Ag/AgCl electrode or saturated calomel electrode is used as reference electrode. Scan rate is varied at 10 to 2000 mV/sec, and the coating amount of ruthenium oxide may be controlled through the cycle number. In an embodiment of the present invention, a cycle number of 10 to 50 is used.

Besides, the conducting metal oxide film layer having a network structure of nanograins and nanoparticles can be used to replace metal electrode, because it has superior inherent electrical conductivity.

EXAMPLES

The present invention is described further by various examples. These examples are for illustrative purposes only, and are not intended to be limitative.

Example 1

Preparation of Ruthenium Oxide Nanofiber Network Through Preparation of Ruthenium Oxide Precursor-Polyvinyl Acetate Composite Fiber Layer and Post Heat Treatment 1.6 g of polyvinyl acetate (molecular weight: 1,000,000) was dissolved in 20 mL of dimethylformamide for about a day. 5 g of ruthenium(III) chloride hydrate ($RuCl_3 \cdot nH_2O$) was added to the resultant polymer solution and dissolved by mixing. Because ruthenium(III) chloride hydrate dissolves well in DMF, acetic acid may not be used for enhancing catalytic reaction. Following the reaction, the precursor was transferred to a syringe. The syringe was mounted on an electrospinning apparatus and a voltage was applied between the syringe tip and the current collector to prepare a ruthenium precursor-polyvinyl acetate composite fiber layer. Here, the applied voltage was 10 kV, flow rate was 5 μL/min, total ejection amount was 600 μL, and distance between the tip and the current collector was about 17.5 cm. In the ruthenium precursor-polyvinyl acetate composite fiber layer formed by the electrospinning, the polymer and the ruthenium oxide precursor were present as mixed with each other. The thickness of the composite fiber layer can be controlled by changing the ejection amount.

Surface characteristics of the ruthenium precursor/PVAc composite fiber prepared in Example 1 and the ruthenium oxide nanofiber prepared via heat treatment are described hereinbelow.

Figure 3:
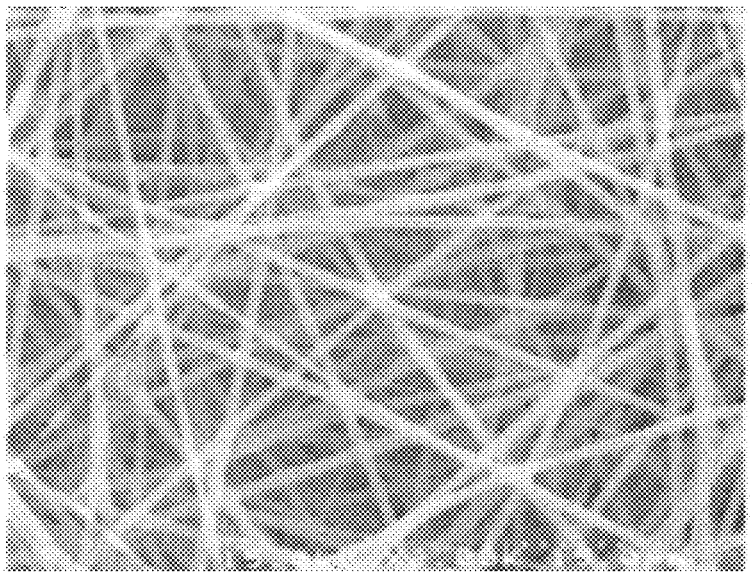
FIG. 3a shows a scanning electron microscopic (SEM) image of a RuO$_2$/PVAc composite fiber prepared by electrospinning a mixture solution of a precursor capable of forming RuO$_2$ (ruthenium oxide) via heat treatment and PVAc (polyvinyl acetate, molecular weight=1,000,000) on a current collector, in accordance with the present invention.
FIG. 3b shows an enlarged view of the RuO$_2$/PVAc composite fiber of FIG. 3a (FIG. 3a at ×2,000 magnification, and FIG. 3b at ×20,000)
Figure 3:
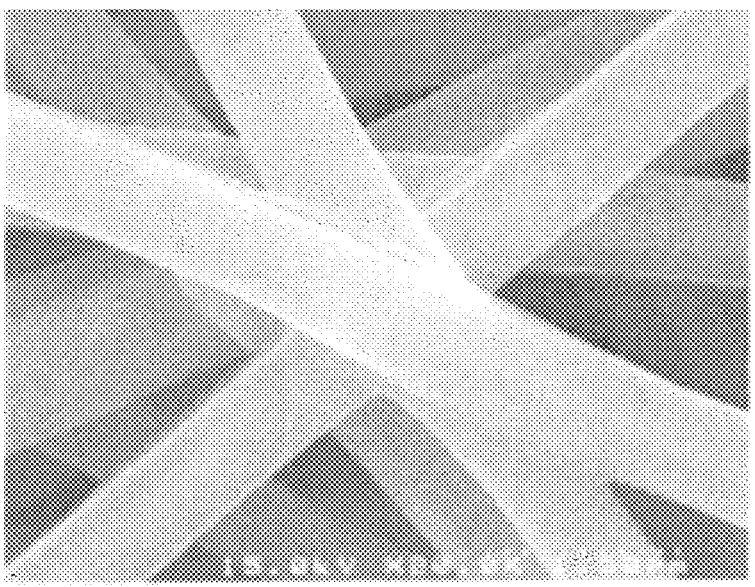

FIG. 3a shows a scanning electron microscopic (SEM) image of a $RuO_2$/PVAc composite fiber prepared by electrospinning a mixture solution of a precursor capable of forming $RuO_2$ (ruthenium oxide) via heat treatment and PVAc (polyvinyl acetate, molecular weight=1,000,000) on a current collector, in accordance with the present invention, and FIG. 3b shows an enlarged view of the $RuO_2$/PVAc composite fiber of FIG. 3a. FIG. 3a is at ×2,000 magnification, and FIG. 3b is at ×20,000 magnification. Although the actual composite fiber is not in the form oxide during the electrospinning, the PVAc composite fiber including the ruthenium precursor will be expressed simply as $RuO_2$/PVAC.

Figure 4:
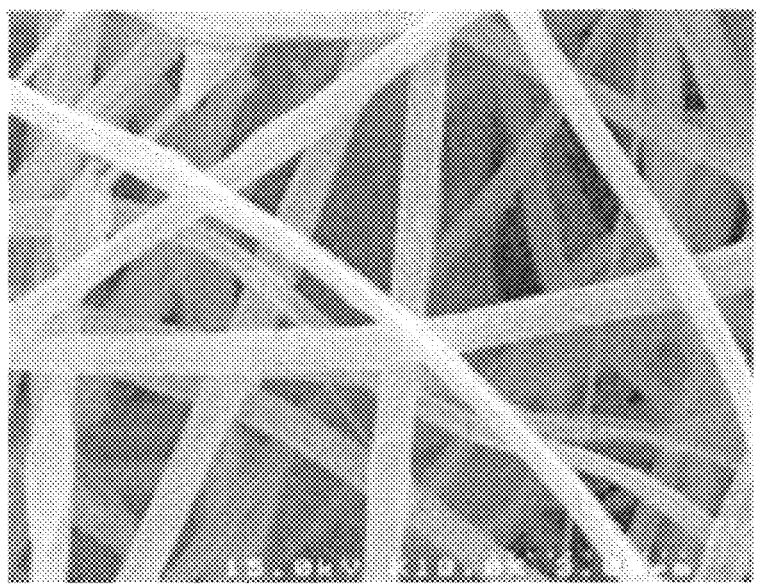
FIG. 4a shows an SEM image of a RuO$_2$ nanofiber prepared by heat treating the RuO$_2$/PVAc composite fiber at 450° C. without heat compressing, in accordance with the present invention.
FIG. 4b shows an enlarged view of the RuO$_2$ nanofiber (FIG. 4a at ×10,000 magnification, and FIG. 4b at ×30,000)
Figure 4:
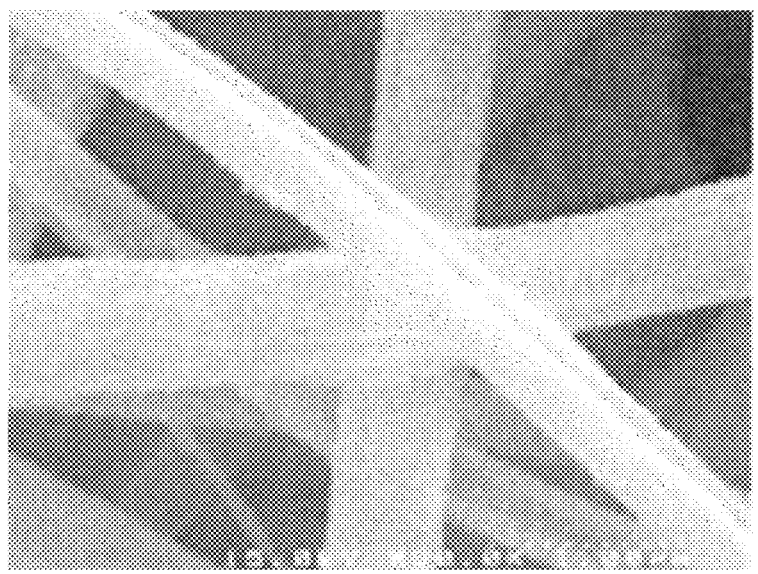

FIG. 4a shows an SEM image of a $RuO_2$ nanofiber prepared by heat treating the resultant $RuO_2$/PVAc composite fiber at 450° C. without heat compressing. It can be confirmed that a continuous nanofiber network is formed well. FIG. 4b shows an enlarged view of the $RuO_2$ nanofiber, the diameter of the nanofiber ranging from 200 nm to 600 nm. FIG. 4a is at ×10,000 magnification, and FIG. 4b is at ×30,000 magnification.

Figure 5:
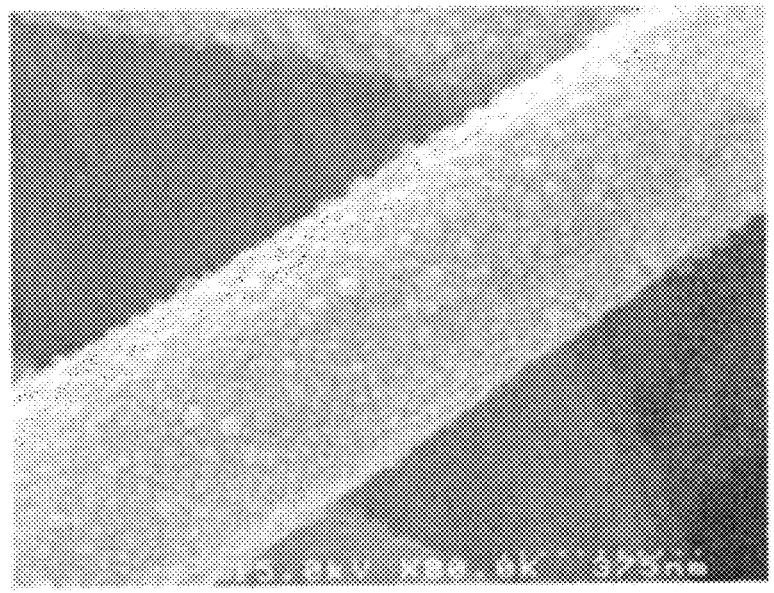
FIG. 5a and FIG. 5b shows SEM images of a RuO$_2$ nanofiber prepared by heat treating the RuO$_2$/PVAc composite fiber at 450° C. without heat compressing, in accordance with the present invention (FIG. 5a at ×80,000 magnification, and FIG. 5b at ×150,000)
Figure 5:
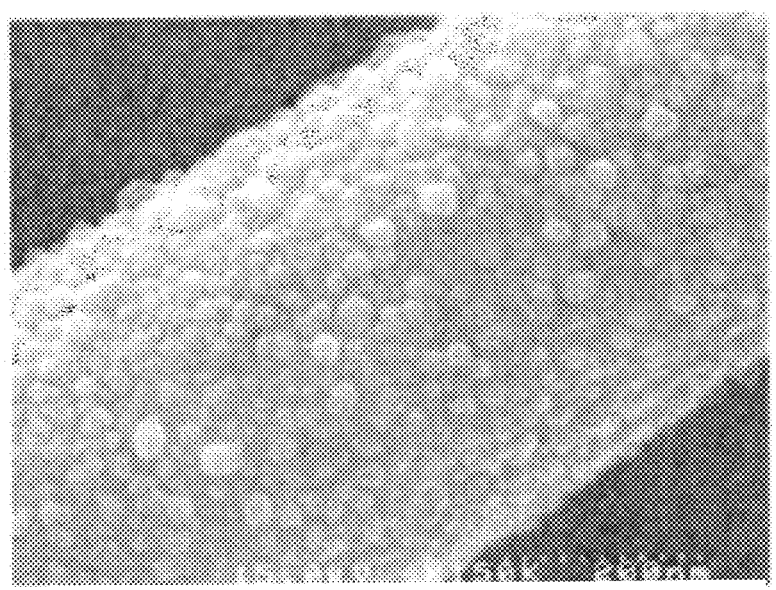

FIG. 5a and FIG. 5b shows SEM images of a $RuO_2$ nanofiber prepared by heat treating the $RuO_2$/PVAc composite fiber at 450° C. without heat compressing, in accordance with the present invention at ×80,000 magnification and at ×150,000 magnification, respectively. A network structure of nanofiber comprising ultrafine nanograins can be confirmed. Transmission electron microscopic (TEM) analysis was carried out in order to identify the crystal structure of the resultant ultrafine nanograins. TEM analysis sample was prepared by subjecting the heat treated ruthenium oxide nanofiber to ultrasonic in ethanol, followed by dispersing on Cu grid and drying. TEM analysis was carried out using Tecnai G2, at 200 keV. Elemental analysis (EDS) was carried out along with lattice analysis.

Figure 6:
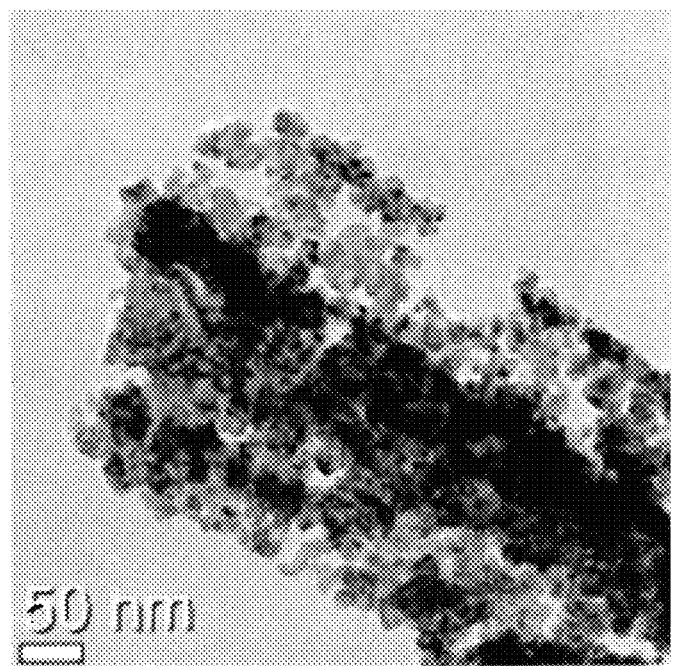
Figure 6:
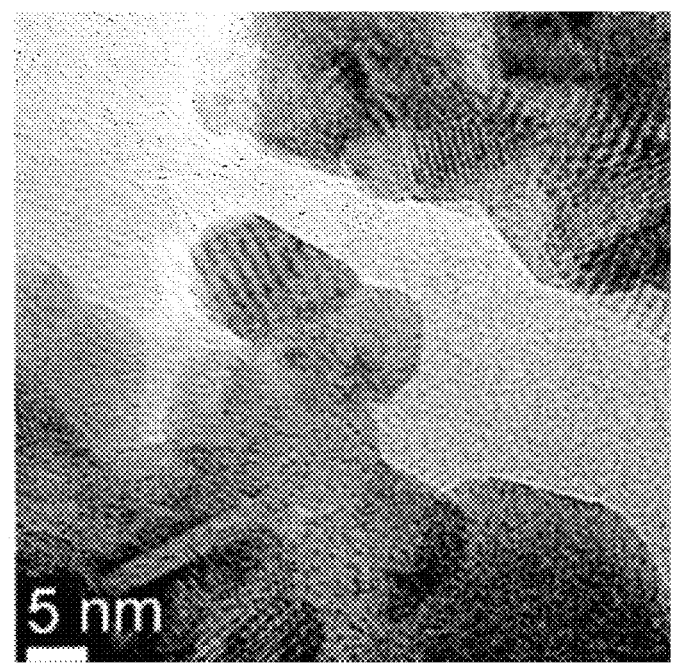

FIG. 6a shows a transmission electron microscopic (TEM) image of a $RuO_2$ nanofiber prepared by heat treating the $RuO_2$/PVAc composite fiber at 450° C. without heat compressing. Fine ruthenium oxide grains are clearly seen. FIG. 6b shows a high resolution TEM (HR-TEM) image of FIG. 6a. The fine structure of well-established crystallization of ruthenium oxide with grain size ranging from 5 nm to 30 nm can be confirmed.

Figure 7:
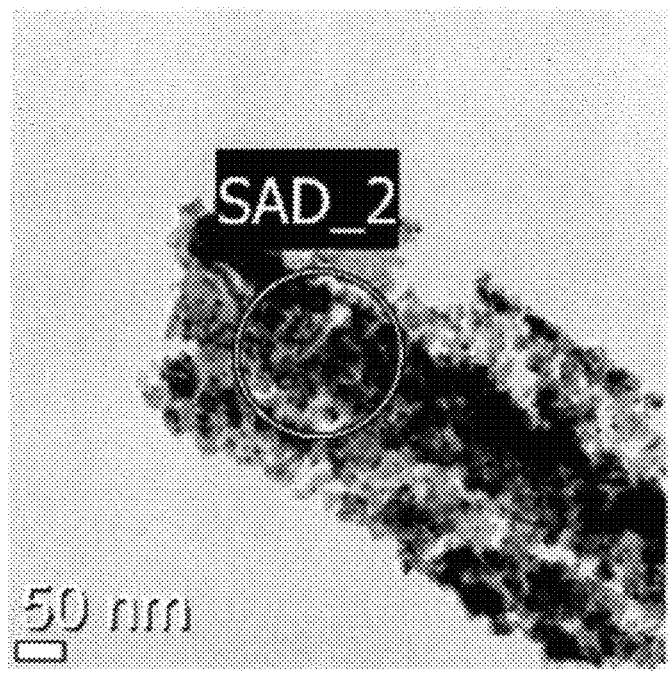
FIG. 7a and FIG. 7b show electron diffraction images of a RuO$_2$ nanofiber prepared by heat treating the RuO$_2$/PVAc composite fiber at 450° C. without heat compressing, in accordance with the present invention.
Figure 7:
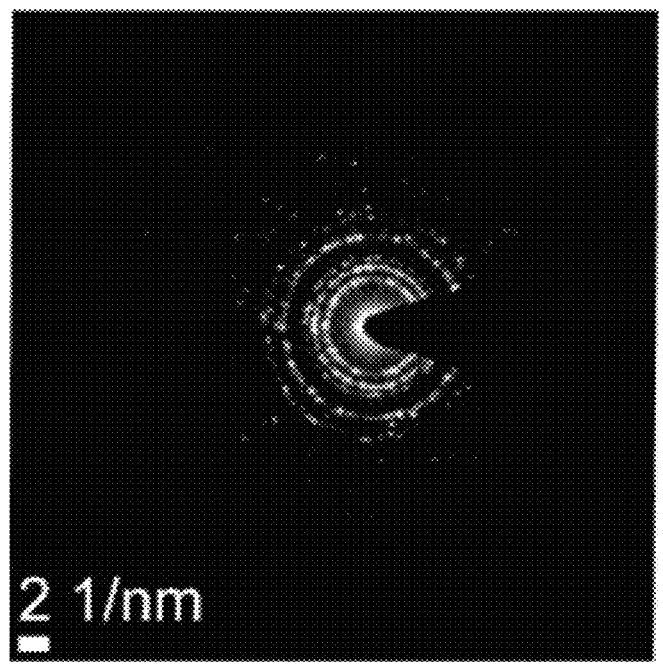

FIG. 7a and FIG. 7b show electron diffraction images of a $RuO_2$ nanofiber prepared by heat treating the $RuO_2$/PVAc composite fiber at 450° C. without heat compressing, in accordance with the present invention. The apparent ring pattern indicates that crystallization is established well.

Example 2

Preparation of Ruthenium Oxide Nanofiber Network Comprising Nanograins and/or Nanoparticles Through Heat Compression and Post Heat Treatment of Ruthenium Precursor-Polyvinyl Acetate Composite Fiber Layer The ruthenium precursor/polyvinyl acetate composite fiber prepared in Example 1 was pressed using a lamination machine (120° C., pressing pressure: 0.1 MPa, pressing time: 90 seconds) and baked at 450° C. for 30 minutes to prepare a ruthenium oxide network comprising nanograins and/or nanoparticles. The surface structure varies depending on the pressing pressure and time. Further, the heat pressing temperature can be varied depending on the glass transition temperature of the polymer used. Especially, the size of nanograins can be easily controlled by controlling the heat treatment temperature.

Figure 8:
FIG. 8 shows an SEM image of a RuO$_2$/PVAc composite fiber prepared by electrospinning in accordance with the present invention, after heat compressing (120° C., 90 seconds, 0.1 MPa)
Figure 9:
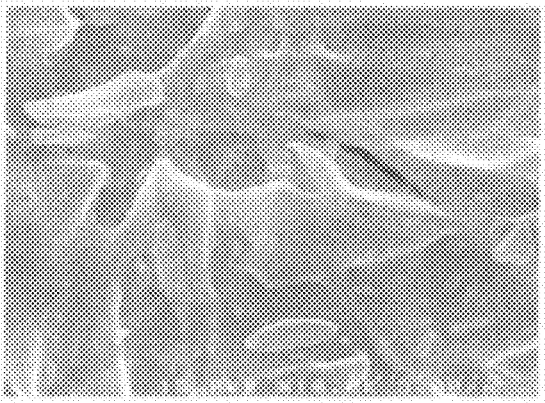
FIG. 9a shows an SEM image of a RuO$_2$/PVAc composite fiber prepared by electrospinning on a current collector in accordance with the present invention, after heat compressing (120° C., 90 seconds, 0.1 MPa) and heat treating (450° C.)
FIG. 9b shows an enlarged view (FIG. 9a at ×10,000 magnification, and FIG. 9b at ×100,000)
Figure 9:
Figure 10:
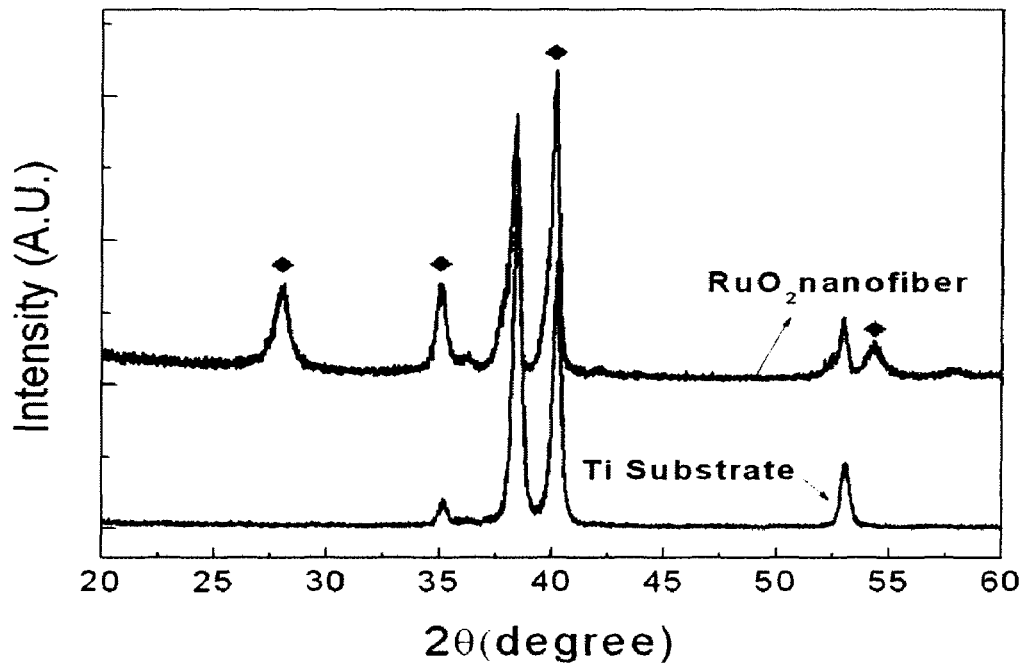
FIG. 10 shows an X-ray diffraction pattern of a RuO$_2$ network of nanograins prepared on a Ti substrate in accordance with the present invention.
Figure 11:
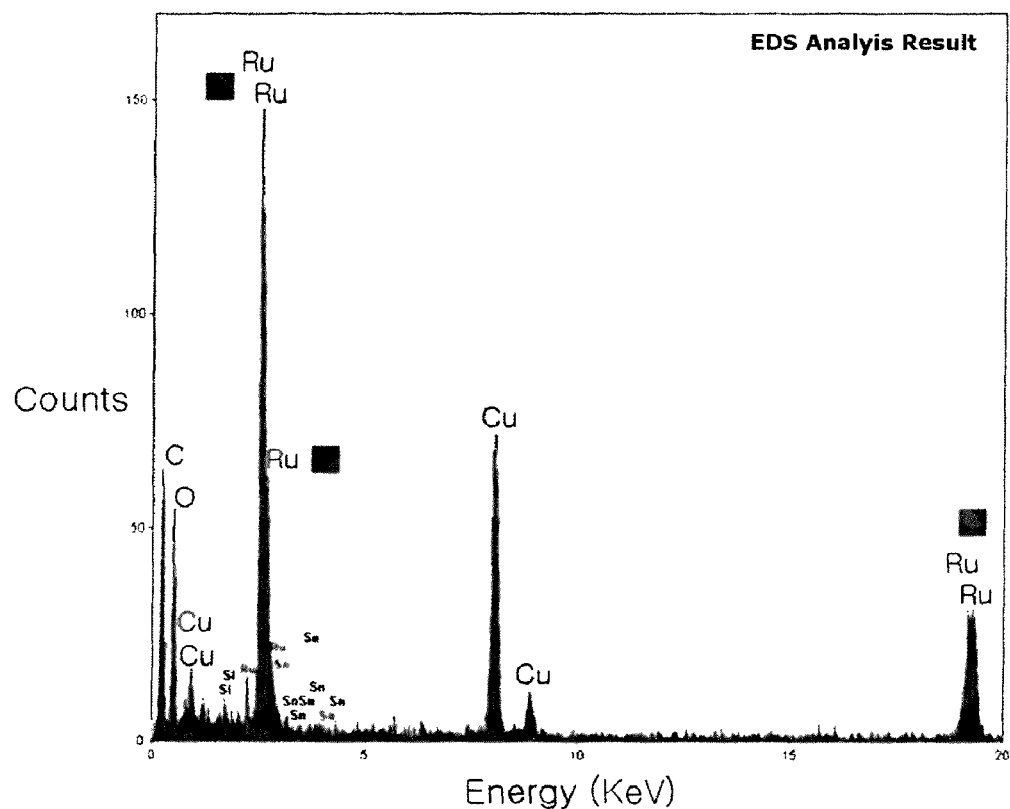
FIG. 11 shows an EDS (energy dispersive spectroscopy) analysis result of a RuO$_2$ network of nanograins prepared in accordance with the present invention.

FIG. 8 shows an SEM image of a $RuO_2$/PVAc composite fiber prepared by electrospinning in accordance with the present invention, after heat compressing (120° C., 90 seconds, 0.1 MPa). As seen in FIG. 8, PVAc, which has a low glass transition temperature, was completely melted and resulted in a wholly connected structure. When the heat compressing time is reduced, the composite fiber is melted partly, resulting in a network structure of ruthenium oxide in which part of the network structure of nanofiber remains, after heat compressing and heat treatment. As seen in FIG. 8, when the heat compressed $RuO_2$/PVAc composite fiber is heat treated at 450° C., a nanofiber network structure comprising ultrafine nanograins is attained as seen in FIG. 9a. From FIG. 9b which is an enlarged view at ×100,000 magnification, a network structure of ruthenium oxide comprising ultrafine grains with size ranging from 5 to 30 nm can be clearly identified. The formation of the ruthenium oxide nanofiber network according to the present invention is not confined to a particular substrate. FIG. 10 shows an X-ray diffraction pattern of a $RuO_2$ network of nanograins prepared on a Ti substrate. As can be seen in FIG. 10, a rutile structure of a single phase is established well on the Ti substrate, followed by heat compressing. The same structure is observed not just on the Ti substrate but also on other substrates. The EDS analysis result shown in FIG. 11 also shows clear detection of Ru and O.

Figure 12:
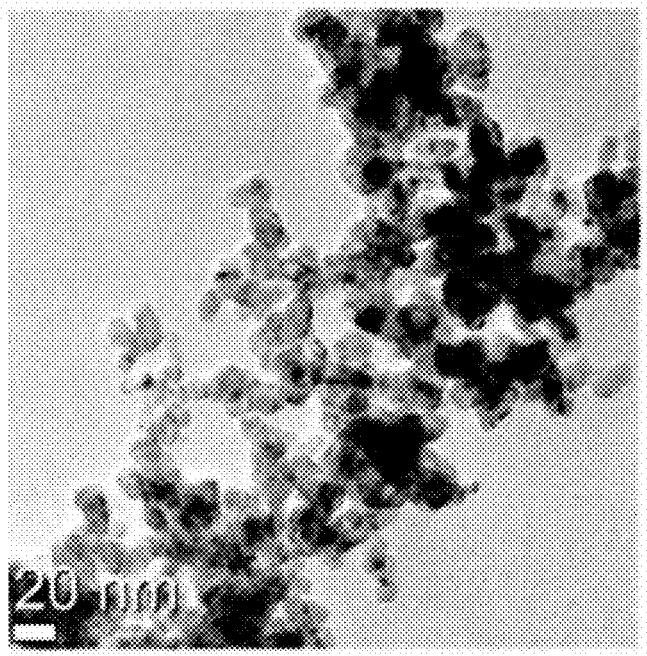
FIG. 12a shows a TEM image of a RuO$_2$ network prepared by heat compressing (120° C., 90 seconds, 0.1 MPa) and heat treating (450° C.) the RuO$_2$/PVAc composite fiber in accordance with the present invention.
FIG. 12b shows an enlarged view.
Figure 12:
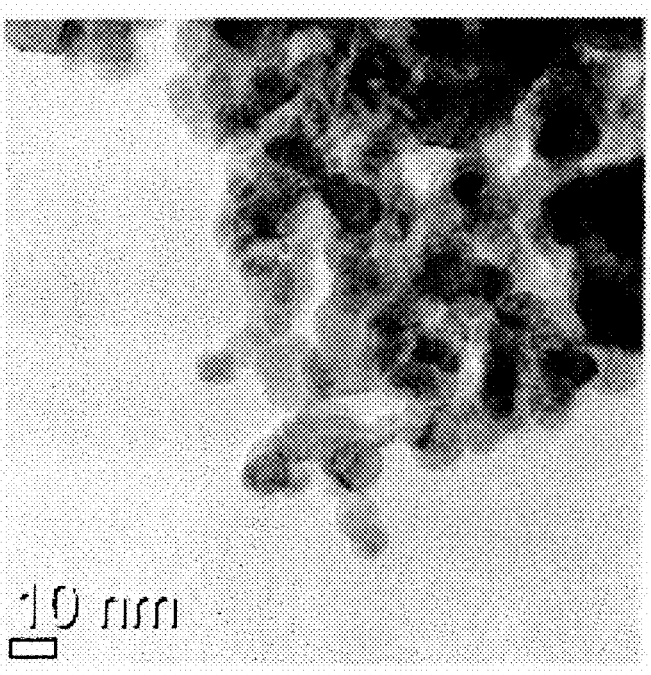

FIG. 12a shows a TEM image of a $RuO_2$ network prepared by heat compressing (120° C., 90 seconds, 0.1 MPa) and heat treating (450° C.) the $RuO_2$/PVAc composite fiber in accordance with the present invention. Fine ruthenium oxide grains are clearly shown. FIG. 12b shows an enlarged HR-TEM image of FIG. 12a. A fine structure of ruthenium oxide crystals with a size ranging from 5 nm to 30 nm is clearly shown.

Figure 13:
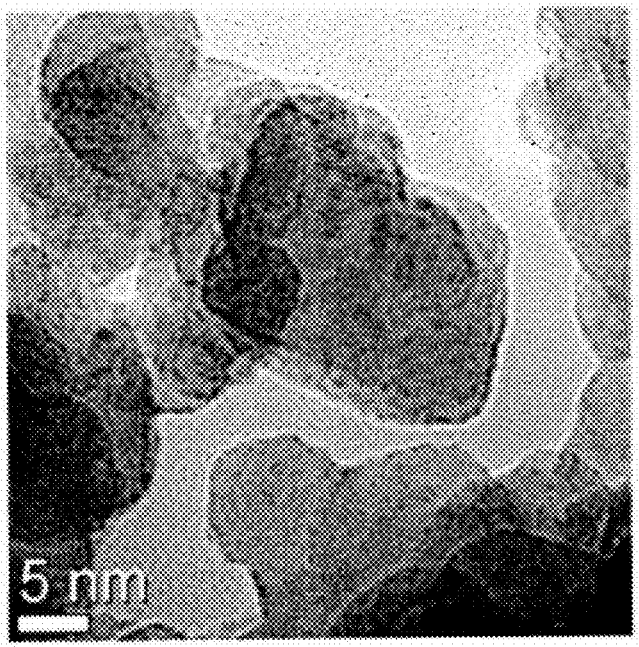
FIG. 13a and FIG. 13b show high resolution TEM images of a RuO$_2$ network prepared by heat compressing (120° C., 90 seconds, 0.1 MPa) and heat treating (450° C.) the RuO$_2$/PVAc composite fiber in accordance with the present invention.
Figure 13:
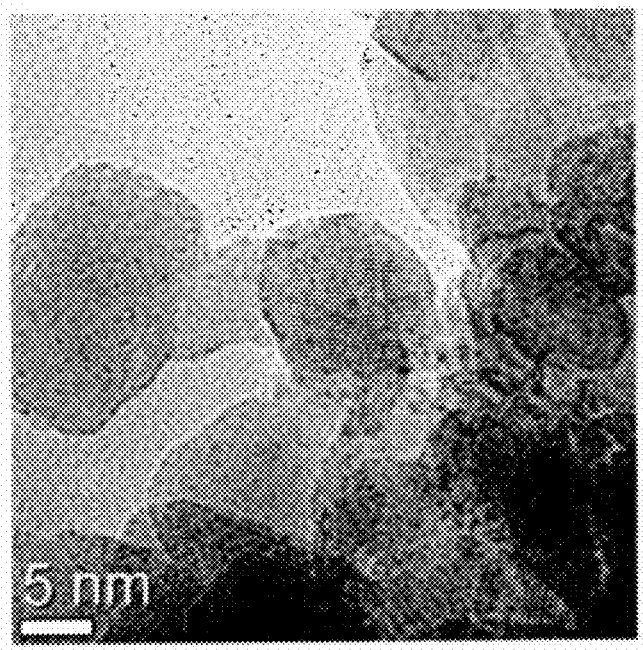

FIG. 13a and FIG. 13b show HR-TEM images of a $RuO_2$ network prepared by heat compressing (120° C., 90 seconds, 0.1 MPa) and heat treating (450° C.) the $RuO_2$/PVAc composite fiber in accordance with the present invention. Fine ruthenium oxide grains are clearly shown, and a fine structure of ruthenium oxide crystals with a size ranging from 5 nm to 30 nm is clearly shown.

The ruthenium oxide network comprising nanograins and/or nanoparticles formed in Example 2 through heat compression and heat treatment has superior adhesivity to a substrate and, thus, can be used to fabricate devices with superior thermal, mechanical and electrical contact properties.

In the above, the preparation of ruthenium oxide network has been described. However, as described earlier, a nanowire network can be attained from any oxide having conducting property. Specific examples thereabout are described below.

A composite fiber was prepared in the same manner as in Examples 1 and 2, except for using conducting metal derivatives listed in Table 1 instead of ruthenium(III) chloride hydrate. Through heat treatment, it is possible to prepare various conducting metal oxide films having a network of conductive nanograins and/or nanoparticles.

TABLE 1

| | Conducting metal oxide | Conducting metal derivative | Polymer | Grain/particle size (nm) | Specific surface area (m$^2$/g) |
|---|---|---|---|---|---|
| Example 3 | IrO$_2$ | Iridium(III) chloride hydrate | PVAc | 10 to 20 | 20 to 150 |
| Example 4 | NiO | Nickel chloride | PVA | 10 to 30 | 20 to 150 |

Conducting oxide nanowire networks of IrO$_2$ and NiO are prepared in the same manner as in Examples 1 and 2. In each case, the selection of metal derivative for obtaining the wanted conducting metal oxide, selection of polymer, and selection of solvent for dissolving the metal derivative are important.

Example 3

Preparation of Iridium Oxide Nanofiber Network Comprising Nanograins and/or Nanoparticles Through Heat Compression and Post Heat Treatment of Iridium Precursor-Polyvinyl Acetate Composite Fiber Layer In order to prepare conducting metal oxide IrO$_2$ listed in Table 1, iridium(III) chlorite hydrate (298.56 g/mol) was dissolved in dimethylformamide (DMF). Polyvinyl acetate (PVAc, molecular weight: 500,000 to 1,000,000) was dissolved in the DMF solution of the iridium precursor. Following the reaction, the precursor was transferred to a syringe. The syringe was mounted on an electrospinning apparatus and a voltage was applied between the syringe tip and the current collector to prepare an iridium precursor-polyvinyl acetate composite fiber layer. Here, the applied voltage was 10 kV, flow rate was 5 μL/min, total ejection amount was 600 μL, and distance between the tip and the current collector was about 17.5 cm. In the iridium precursor-polyvinyl acetate composite fiber layer formed by the electrospinning, the polymer and the iridium oxide precursor were present as mixed with each other. The thickness of the composite fiber layer can be controlled by changing the ejection amount. The iridium precursor/polyvinyl acetate composite fiber prepared in Example 3 was pressed using a lamination machine (120° C., pressing pressure: 0.1 MPa, pressing time: 90 seconds) and baked at 450° C. for 30 minutes to prepare an iridium oxide network comprising nanograins and/or nanoparticles. The surface structure varies depending on the pressing pressure and time. Further, the heat pressing temperature can be varied depending on the glass transition temperature of the polymer used. Especially, the size of nanograins or nanoparticles can be easily controlled by controlling the heat treatment temperature.

Figure 14:
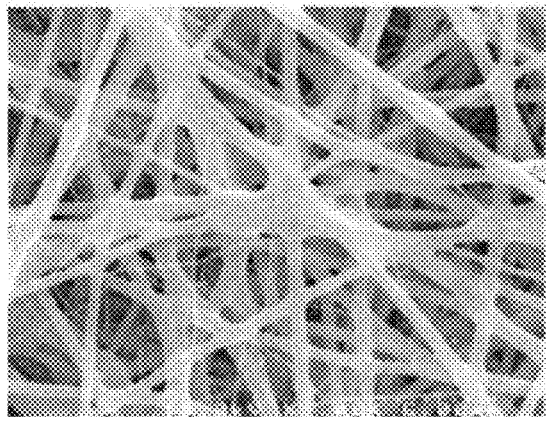
FIG. 14a shows an SEM image of an IrO$_2$/PVAc composite fiber prepared by electrospinning in accordance with the present invention.
FIG. 14b shows an SEM image of the IrO$_2$/PVAc composite fiber after heat compressing (120° C., 90 seconds, 0.1 MPa)
FIG. 14c shows an SEM image of an iridium oxide (IrO$_2$) network formed after the heat compressing and heat treating (450° C.)
Figure 14:
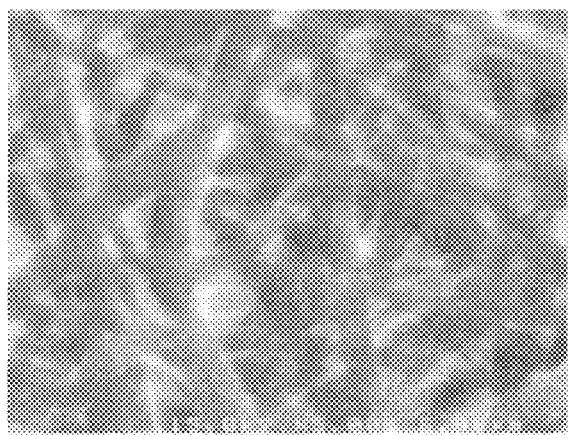
Figure 14:
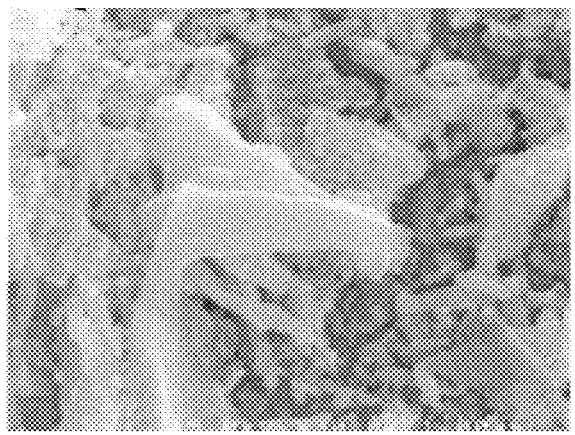

FIG. 14a shows an SEM image of an IrO$_2$/PVAc composite fiber prepared by electrospinning in accordance with the present invention. It can be seen that the diameter of the nanofiber is about 200 nm to 600 nm. FIG. 14b shows an SEM image of the IrO$_2$/PVAc composite fiber after heat compressing (120° C., 90 seconds, 0.1 MPa). An inter-connected surface structure attained through partial or whole melting of the polymer is seen. FIG. 14c shows an SEM image of an iridium oxide (IrO$_2$) network formed after the heat compressing and heat treating (450° C.). It can be seen that an iridium oxide network structure comprising fine nanograins and/or nanoparticles was formed.

Example 4

Preparation of Nickel Oxide Nanofiber Network Comprising Nanograins and/or Nanoparticles Through Heat Compression and Post Heat Treatment of Nickel Oxide Precursor-Polyvinyl Alcohol Composite Fiber Layer 3 g of polyvinyl alcohol (Mw: 88,000) was dissolved in 15 mL of pure water (DI water) for about a day. 2.65 g of nickel chloride dissolved in pure water (DI water) was mixed with the resultant polymer solution. Because nickel chloride dissolves well in pure water (DI water), acetic acid needed not be used for enhancing catalytic reaction.

Figure 15:
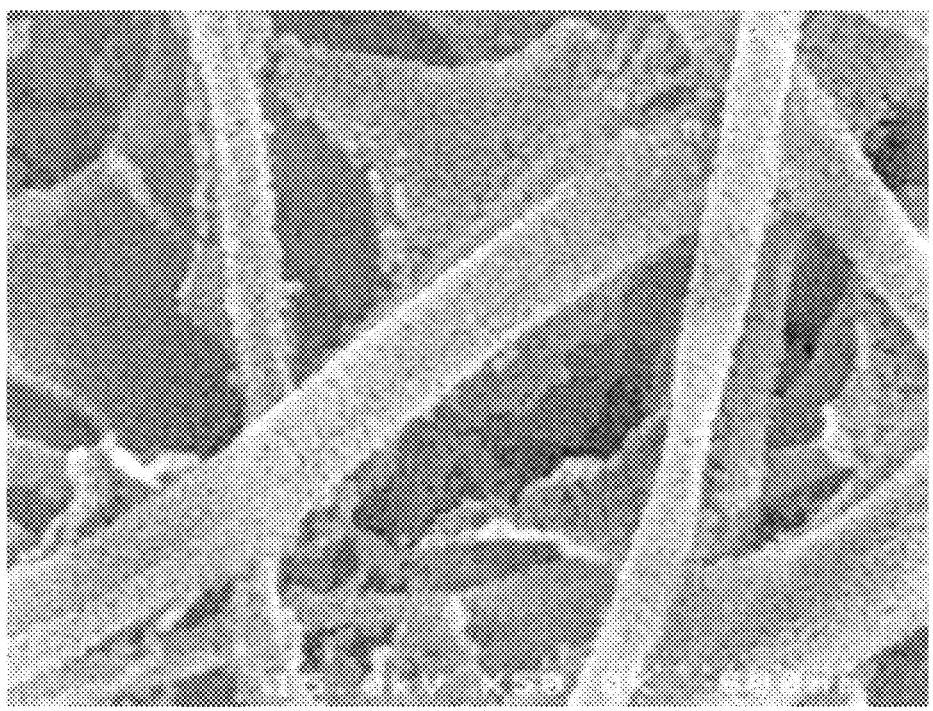
FIG. 15 shows an SEM image of a nickel oxide (NiO) network prepared by electrospinning, heat compressing and heat treating in accordance with the present invention.

Following the reaction, the transparent precursor was transferred to a syringe. The syringe was mounted on an electrospinning apparatus and a voltage was applied between the syringe tip and the current collector to prepare a nickel oxide-polyvinyl alcohol composite fiber layer. Here, the applied voltage was 18 kV, flow rate was 28 μL/min, total ejection amount was 500 to 1,500 μL, and distance between the tip and the current collector was about 8 cm. In this example, acetic acid was not used. In the nickel oxide-polyvinyl alcohol composite fiber layer formed by the electrospinning, the polymer and the nickel oxide precursor were present as mixed with each other. FIG. 15 shows an SEM image of an NiO network prepared by heat compressing (120° C., 5 minutes, 0.1 MPa) and heat treating (450° C.) the NiO/PVA composite fiber, which had been prepared by the electrospinning. It can be seen that a network structure of fine NiO nanograins and/or NiO nanoparticles with a size of 5 to 30 nm is established well.

Test Example 1

Electrical Properties of Ruthenium Oxide Nanowire Network Structure

In order to identify electrical properties of the ruthenium oxide conducting metal oxide nanowire prepared in Example 1, single ruthenium oxide nanowire was placed on a parallel electrode having an electrode width of 50 to 200 μm. Here, a gold (Au) electrode pad was used. At the lower substrate, either on an Au electrode formed on an alumina substrate (Au (150 nm)/Ti (50 nm)/Al$_2$O$_3$) or on an Au electrode formed on a SiO$_2$/Si substrate (Au (150 nm)/Ti (50 nm)/SiO$_2$/Si), a conducting metal oxide nanowire comprising nanograins and/or nanoparticles was formed by electrospinning. The electrical conductivity of the conducting metal oxide nanowire structure was identified using Agilent B1500. Change of electrical current was measured while varying the applied voltage from −5 V to +5 V.

Figure 16:
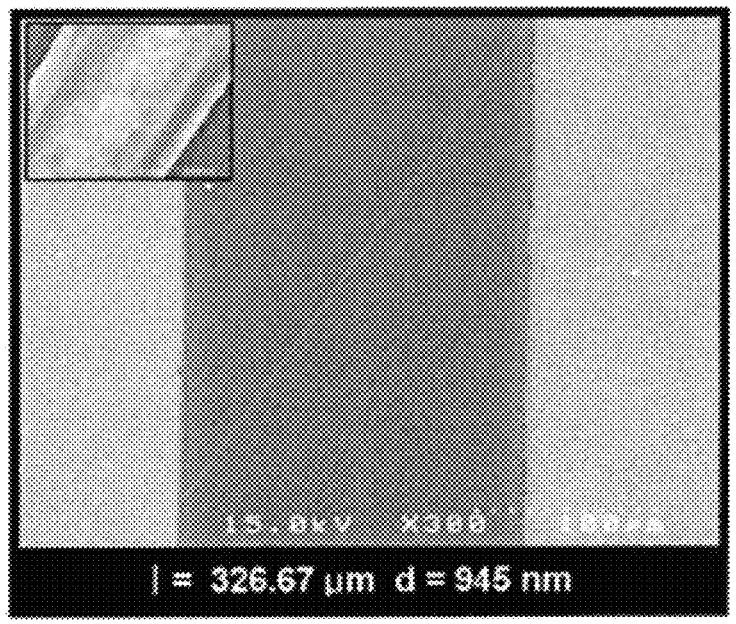
FIG. 16a shows an SEM image of a single RuO$_2$ nanowire prepared in accordance with the present invention.
FIG. 16b shows its electrical property (I-V)
Figure 16:
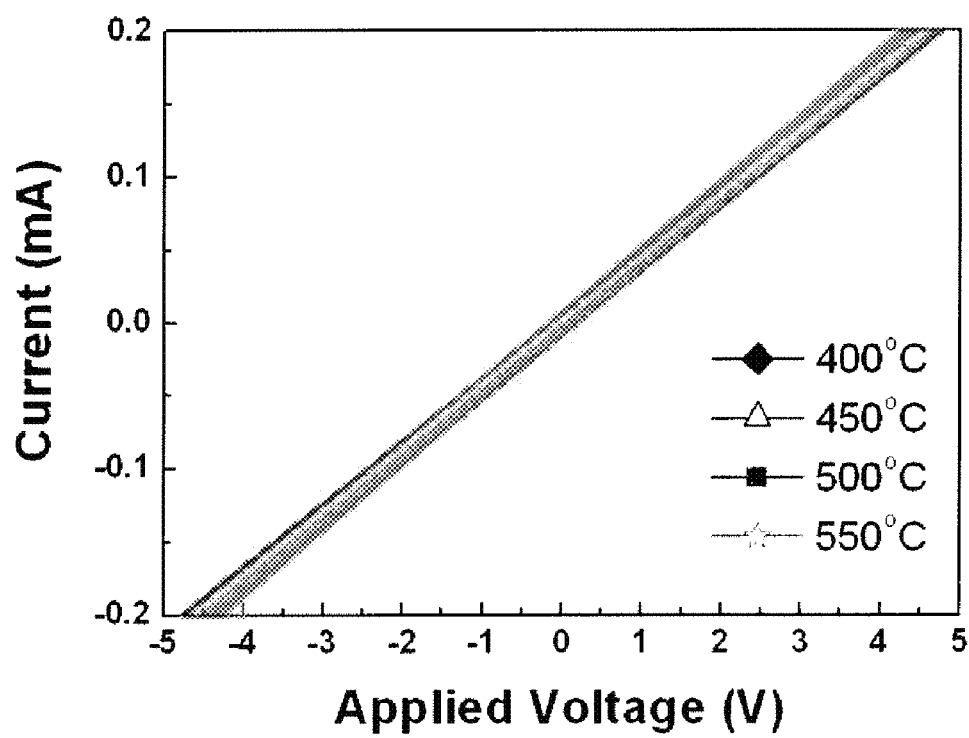

FIG. 16a shows an SEM image of a single RuO$_2$ nanowire comprising nanograins prepared in Example 1. The ruthenium oxide nanowire had a length of 327 μm and a nanowire width of 945 nm. FIG. 16b shows the I-V (current-voltage) characteristics of the single RuO$_2$ nanowire comprising nanograins prepared in Example 1. Conducting property was superior, with the specific resistance, which is calculated from the slope of the I-V curve, being $2.5 \times 10^{-3}$ Ω·m.

Test Example 2

Electrical Properties of Ruthenium Oxide Network Structure Comprising Nanograins and Nanoparticles In order to identify electrical properties of the ruthenium oxide conducting metal oxide film network prepared in Example 2, a conducting metal oxide network comprising nanograins and/or nanoparticles was formed through electrospinning on an Au electrode formed on an alumina substrate (Au (150 nm)/Ti (50 nm)/$Al_2O_3$) with an electrode width of 200 μm and an electrode spacing of 200 μm. In order to identify the electrical conductivity characteristics of the nanowire network structure of conducting metal oxide, current-voltage was examined using Agilent B1500. Change of electrical current was measured while varying the applied voltage from −0.2 V to +0.2 V.

Figure 17:
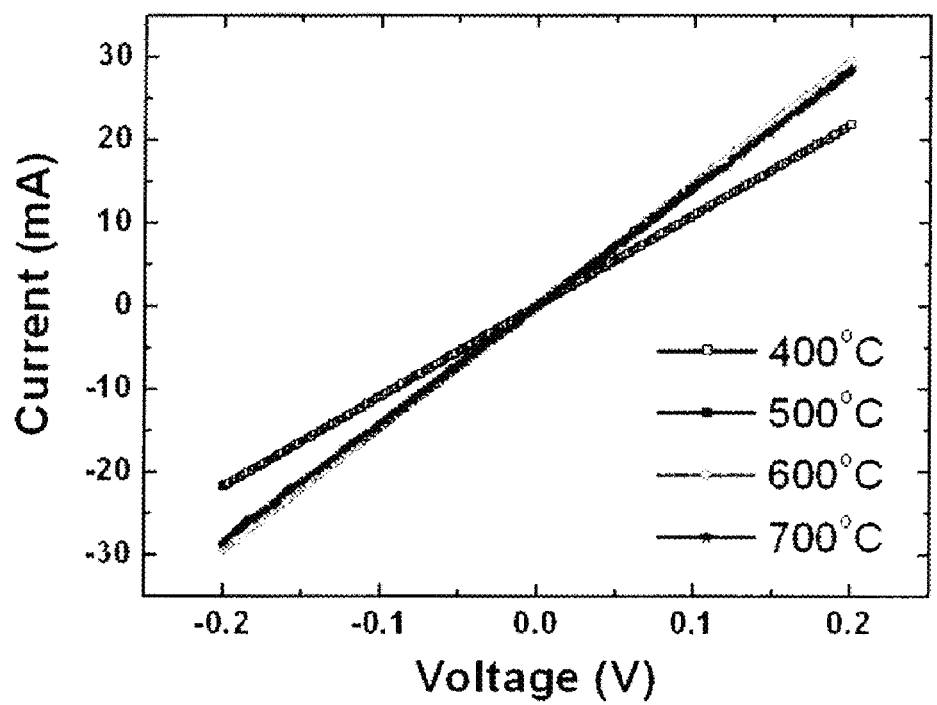
FIG. 17 shows the electrical property (I-V) of a RuO$_2$ network prepared in accordance with the present invention.

FIG. 17 shows the I-V curve of the ruthenium oxide network comprising nanograins and/or nanoparticles prepared in Example 2. Measurement was made at various heat treating temperatures ranging from 400 to 700° C. Conducting property was superior, with the specific resistance, which is calculated from the slope of the I-V curve, ranging from $1.0 \times 10^{-2}$ to $1.5 \times 10^{-2}$ Ωm.

Test Example 3

Preparation of Supercapacitor Electrode Through Hydrous Ruthenium Oxide ($RuO_2$) Coating on Ruthenium Oxide Network Structure Comprising Nanograins and/or Nanoparticles On the ruthenium oxide conducting metal oxide film network prepared in Example 2, a hydrous $RuO_2$ film was deposited by the cyclic voltammetric method in order to coat a ruthenium oxide film comprising amorphous or very fine nanograins. In case of deposition by the cyclic voltammetry method, a three electrode system is used. The substrate on which the deposition is to be carried out (Ti substrate, in this Example) was used as working electrode, platinum was used as counter electrode, and Ag/AgCl electrode or saturated calomel electrode was used as reference electrode. The film layer of ruthenium oxide, which is one of conducting metal oxides having superior conductivity, was formed by immersing a substrate on which conducting metal oxide film having a network of nanograins and/or nanoparticle had been coated in a ruthenium oxide precursor solution prepared by dissolving ruthenium trichloride hydrate ($RuCl_3 \cdot nH_2O$) in deionized water to a concentration of 0.05 M, and then performing coating at 50° C. Stirring was carried out at 100 rpm to attain uniform coating, and voltage was maintained at 0.25 to 1.45 V. As occasion demands, electrolyte such as gallium chloride or hydrogen chloride was added. The coated electrode was heat treated at low temperature, preferably at 150 to 200° C., for 30 minutes to 2 hours. The thickness of the coated ruthenium oxide film was controlled by varying the number of cycles at 10 to 50. Coating sweep rate was 50, 100, 200, 300 and 500 mV/s. The amorphous ruthenium oxide film coated ruthenium oxide network was evaluated by the cyclic voltammetric method in 0.5 M $H_2SO_4$ sulfuric acid solution. Cyclic voltammetry is one of the methods enabling the measurement of capacitive behavior. In CV (cyclic voltammogram), high current density and rectangular symmetry at anodic and cathodic sweeps provide superior supercapacitor characteristics.

Figure 18:
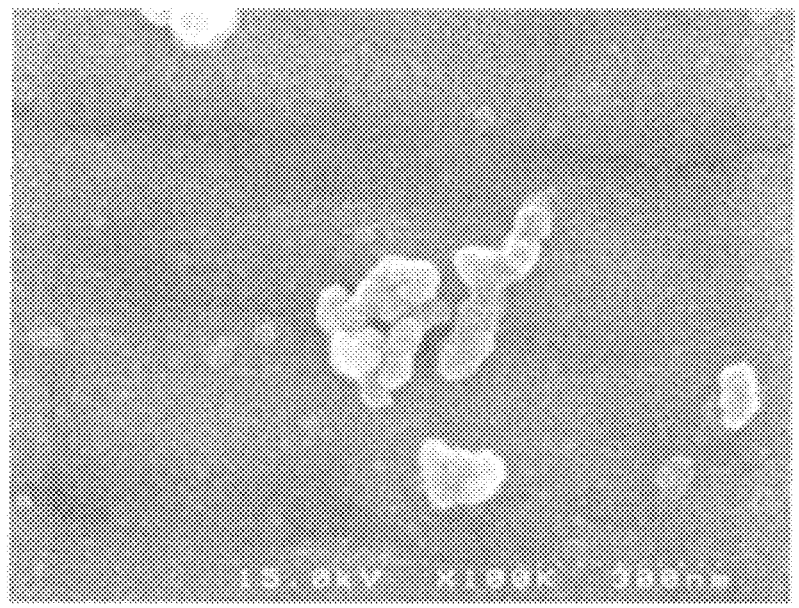
FIG. 18 shows an SEM image of a RuO$_2$ network, on which a RuO$_2$ film has been coated, prepared in accordance with the present invention.

FIG. 18 shows an SEM image of a $RuO_2$ network, on which a hydrous $RuO_2$ film has been coated, prepared in Test Example 3. It can be seen that a network structure of fine nanograins or nanoparticles are maintained even after the coating of the amorphous $RuO_2$ film.

Figure 19:
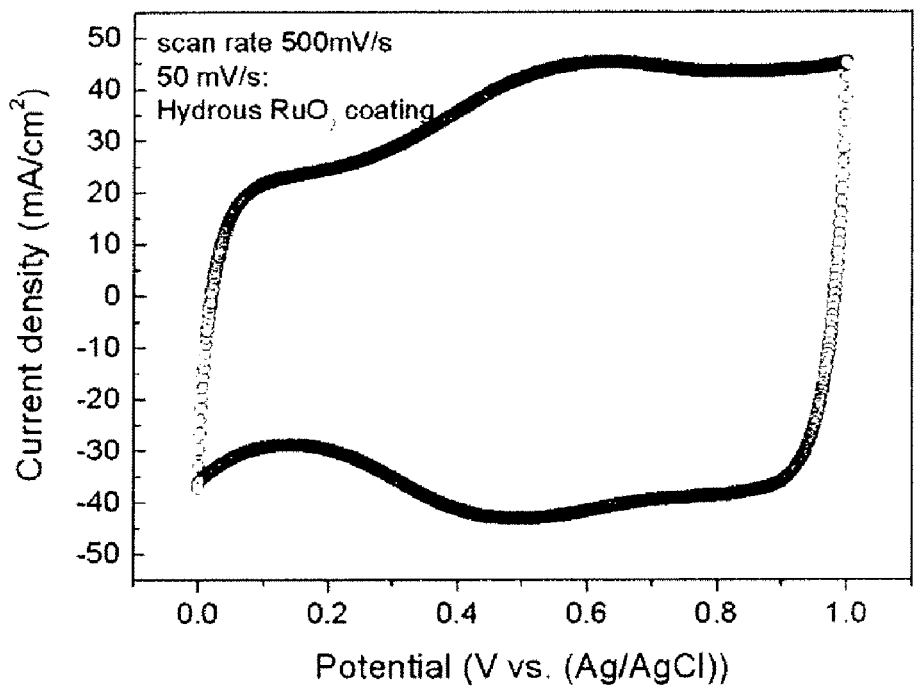
FIG. 19 shows the supercapacitor property of an electrode material in which a RuO$_2$ film coated RuO$_2$ oxide network prepared in accordance with the present invention is used.

FIG. 19 shows the supercapacitor property of an electrode material in which the hydrous $RuO_2$ coated $RuO_2$ oxide network prepared in Test Example 3 was used. The ruthenium oxide network comprising nanograins and/or nanoparticles, which had been prepared through electrospinning, heat compressing and heat treatment, had a large specific surface area. Also, due to high conductivity of $RuO_2$, it had high electrical conductivity. An amorphous hydrated ($RuO_2$-$xH_2O$) $RuO_2$ film was coated on the ruthenium oxide nanoparticle network, and its supercapacitor property was confirmed through Test Example 3. Hydrous $RuO_2$ coating was carried out at 50 mV/s. As seen in FIG. 19, a rectangular CV characteristic was observed when the sweep rate was 500 mV/s.

Figure 20:
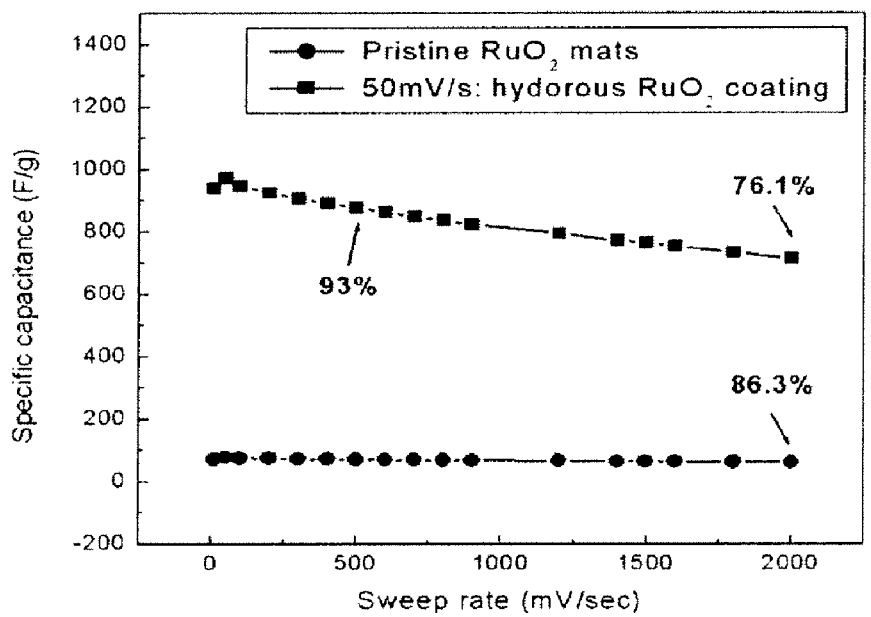
FIG. 20 shows the supercapacitor property of an electrode material in which a RuO$_2$ film coated RuO$_2$ oxide network prepared in accordance with the present invention is used.

FIG. 20 shows the change of specific capacitance when the sweep rate was varied from 0 to 2000 mV/s. The amorphous hydrated ($RuO_2$-$xH_2O$) $RuO_2$ film coated $RuO_2$ nanoparticle network film exhibited superior characteristics even at high sweep rate of 2000 mV/s, with 76.1% of the initial capacitance being maintained. On the contrary, the $RuO_2$ nanoparticle network prepared by electrospinning, heat compressing and heat treatment but with no amorphous hydrated ($RuO_2$-$xH_2O$) $RuO_2$ film coated thereon showed low specific capacitance of 90 F/g.

Having described the present invention; it will be appreciated by those skilled in the art that many changes and modifications may be made to the above-described embodiments without departing from the spirit and scope of the claimed invention.

What is claimed:

1. A porous conducting metal oxide electrode, comprising:
   a) a current collector;
   b) a conducting metal oxide film layer having a nanofiber network structure of nanograins or nanoparticles formed on at least one surface of the current collector; and
   c) a conducting metal oxide coating layer formed on the conducting metal oxide film layer.

2. The porous conducting metal oxide electrode of claim 1, wherein the conducting metal oxide film layer is selected from the group consisting of ruthenium oxide ($RuO_2$), iridium oxide ($IrO_2$) and nickel oxide (NiO).

3. The porous conducting metal oxide electrode of claim 1, wherein the conducting metal oxide film layer has a specific surface area in the range of from about 15 to 150 $m^2$/g.

4. The porous conducting metal oxide electrode of claim 1, wherein the nanograins or nanoparticles have an average particle diameter in the range of from about 5 to 50 nm.

5. The porous conducting metal oxide electrode of claim 4, wherein said nanograins or nanoparticles have an average particle diameter in the range of from 5 to 30 nm.

6. The porous conducting metal oxide electrode of claim 1, wherein the current collector is made of platinum (Pt), gold (Au), palladium (Pd), iridium (Ir), silver (Ag), rhodium (Rh), ruthenium (Ru), nickel (Ni), stainless steel, aluminum (Al), titanium (Ti), molybdenum (Mo), chromium (Cr), copper (Cu), tungsten (W), ITO (In doped $SnO_2$), FTO (F doped $SnO_2$) or a metal formed on Si wafer.

7. A supercapacitor device comprising the porous conducting metal oxide electrode of claim 1.

8. The porous conducting metal oxide electrode of claim 1, wherein the conducting metal oxide coating layer is selected from the group consisting of ruthenium oxide, rubidium oxide, nickel oxide, cobalt oxide, manganese oxide and vanadium oxide.

9. A preparation method of a porous conducting metal oxide electrode comprising:
   a) a first step of spinning a mixture solution of a conducting metal precursor and a polymer on a current collector to prepare a conducting metal precursor-polymer composite fiber;
   b) a second step of heat compressing or hot pressing the conducting metal precursor-polymer composite fiber;
   c) a third step of heat treating the heat compressed or hot pressed composite fiber to prepare a porous conducting metal oxide film having a network structure with the polymer removed from the composite fiber; and
   d) a fourth step of coating a conducting metal oxide on the porous conducting metal oxide film.

10. The method of claim 9, wherein the conducting metal precursor is a chloride of Ru, Ir or Ni.

11. The method of claim 9, wherein the polymer is at least one selected from the group consisting of polymethyl methacrylate (PMMA), polyvinylpyrrolidone (PVP), polyvinyl acetate (PVAc), polyvinyl alcohol (PVA) and polystyrene (PS).

12. The method of claim 9, wherein the first step of spinning is performed by electrospinning, melt-blown spinning, flash spinning or electrostatic melt-blown spinning.

13. The preparation method of claim 9, wherein the heat compression or the hot pressing in the second step is carried out by applying pressure at a temperature above the glass transition temperature of the used polymer.

14. The method of claim 13, wherein the conducting metal oxide coated in the fourth step is selected from the group consisting of $RuO_2$, $IrO_2$, NiO, $MnO_2$ and $VO_x$.

15. The method of claim 13, wherein the polymer is polyvinyl acetate, and a pressure of 0.1 MPa or higher is applied at a temperature of 120° C.

16. The method of claim 9, wherein the conducting metal oxide coated in the fourth step has an amorphous structure or an ultrafine nanograin structure.

17. The method of claim 9, wherein the polymer is a polyvinyl acetate, and a pressure of 0.1 MPa or higher is applied at a temperature of 120° C.

18. The method of claim 9, wherein, in the first step, the solution is prepared by dissolving in a solvent selected from water, ethanol, tetrahydrofuran (THF), dimethylformamide (DMF), dimethylacetamide (DMAc) and toluene.

19. The method of claim 9, wherein the heat treatment in the third step is carried out at 400 to 800° C.

20. The method of claim 9, wherein the coating in the fourth step is carried out using conducting metal oxide by the cyclic voltammetric method or the constant current method.

21. The method of claim 9, wherein the coating prepared in the fourth step is heat treated at 50 to 200° C.

22. The method of claim 16, wherein the conducting metal coated in the fourth step is selected from the group consisting of $RuO_2$, $IrO_2$, NiO, $MnO_2$ and $VO_x$.

* * * * *